United States Patent
Nanduri et al.

(10) Patent No.: US 9,747,044 B2
(45) Date of Patent: *Aug. 29, 2017

(54) INTERLEAVING READ AND WRITE REQUESTS TO REDUCE LATENCY AND MAXIMIZE THROUGHPUT IN A FLASH STORAGE DEVICE

(71) Applicant: Nimble Storage, Inc., San Jose, CA (US)

(72) Inventors: Anil Kumar Nanduri, San Jose, CA (US); Murali Krishna Vishnumolakala, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,808

(22) Filed: Oct. 4, 2016

(65) Prior Publication Data

US 2017/0024149 A1  Jan. 26, 2017

Related U.S. Application Data

(63) Continuation of application No. 14/575,103, filed on Dec. 18, 2014, now Pat. No. 9,489,141.

(51) Int. Cl.
G06F 3/06 (2006.01)

(52) U.S. Cl.
CPC .......... *G06F 3/0613* (2013.01); *G06F 3/0659* (2013.01); *G06F 3/0679* (2013.01); *G06F 3/0688* (2013.01)

(58) Field of Classification Search
CPC ........ G06F 3/064; G06F 13/00; G06F 3/0604; G06F 3/061; G06F 11/3485;
(Continued)

(56) References Cited

U.S. PATENT DOCUMENTS 8,239,589 B1 * 8/2012 Certain ............... G06F 13/1626
710/39
8,510,496 B1 * 8/2013 Totolos, Jr. ........... G06F 3/0613
711/147

(Continued)

*Primary Examiner* — Prasith Thammavong
*Assistant Examiner* — Alex Olson
(74) *Attorney, Agent, or Firm* — Martine Penilla Group, LLP

(57) ABSTRACT

In an all-flash storage array, write requests can take about 9 to 10 times longer than a read request of the same size. There could be several problems when reading or writing from all-flash storage, such as a large write request slowing down small read requests, or other write requests. Also, a large read request may slow down smaller read requests by filling the incoming requests queue. In one implementation, a determination is made on what is the maximum size of a request to flash storage that improves the throughput of a flash chip (e.g., write requests beyond a certain size do not improve throughput). A chunklet is defined as a block of data having the calculated maximum size. As write requests come in, the write requests are broken into chunklets, and then the chunklets are queued for processing by the flash chip. One chunklet is processed at a time per write request. This way, one write request does not monopolize the use of the flash chip for a period of time, allowing other requests to be queued while the chunklet is being processed by the all-flash storage.

15 Claims, 13 Drawing Sheets

(58) Field of Classification Search
CPC .............. G06F 2212/2022; G06F 13/28; G06F 2003/0691; G06F 12/126; G06F 13/161; G06F 13/1626; G06F 13/1642; G06F 12/0246; G06F 3/0613; G06F 3/0679; G06F 12/0238; G06F 2212/202
See application file for complete search history.

(56) References Cited

U.S. PATENT DOCUMENTS

| | | | |
|---|---|---|---|
| 9,335,945 B2 * | 5/2016 | Jayaraman | G06F 3/0646 |
| 2010/0250891 A1 * | 9/2010 | Shalev | G06F 3/061 |
| | | | 711/171 |
| 2011/0072199 A1 * | 3/2011 | Reiter | G06F 13/14 |
| | | | 711/103 |
| 2012/0017043 A1 * | 1/2012 | Aizman | G06F 11/1076 |
| | | | 711/114 |
| 2014/0317336 A1 * | 10/2014 | Fitch | G06F 12/0246 |
| | | | 711/103 |
| 2015/0134857 A1 * | 5/2015 | Hahn | G06F 3/061 |
| | | | 710/5 |
| 2015/0355861 A1 * | 12/2015 | Jayaraman | G06F 3/0613 |
| | | | 711/103 |
| 2016/0041868 A1 * | 2/2016 | Davis | G06F 11/1008 |
| | | | 714/773 |

* cited by examiner 1. 1M write request split into 16k chunks:
   4k-Read-30-29500-115 + 1M-Write-1-81-81
   8k-Read-30-21000-163 + 1M-Write-1-71-71
   16k-Read-30-15500-242 + 1M-Write-1-61-61
   32k-Read-30-12100-380 + 1M-Write-1-13-13

2. 1M write request split into 32k chunks:
   4k-Read-30-22800- 89 + 1M-Write-1-86-86
   8k-Read-30-17800-136 + 1M-Write-1-76-76
   16k-Read-30-13700-214 + 1M-Write-1-64-64
   32k-Read-30-10500-330 + 1M-Write-1-35-35
   64k-Read-30- 6800-427 + 1M-Write-1-10-10

3. 1M write request split into 64k chunks:
   4k-Read-30-16100- 63 + 1M-Write-1-89-89
   8k-Read-30-13200-103 + 1M-Write-1-81-81
   16k-Read-30-11000-171 + 1M-Write-1-73-73
   32k-Read-30- 8800-276 + 1M-Write-1-58-58
   64k-Read-30- 6400-399 + 1M-Write-1-20-20

7. 4k write requests with 8 queue depth:
   4k-Read-30-25200- 99 + 4k-Write-8-21100-83
   8k-Read-30-19400-152 + 4k-Write-8-19000-74
   16k-Read-30-14700-230 + 4k-Write-8-15500-61
   32k-Read-30-10700-336 + 4k-Write-8- 6000-23
   64k-Read-30- 6800-415 + 4k-Write-8- 2300- 9

4. 512k write request split into 16K chunks:
   4k-Read-30-29800-116 + 512k-Write-1-166-83
   8k-Read-30-21200-166 + 512k-Write-1-149-75
   16k-Read-30-15500-243 + 512k-Write-1-127-63
   32k-Read-30-12300-385 + 512k-Write-1- 38-19
   64k-Read-30- 7250-453 + 512k-Write-1- 10- 5

5. 512k write request split into 32k chunks:
   4k-Read-30-26700-104 + 512k-Write-1-163-81
   8k-Read-30-19000-154 + 512k-Write-1-152-76
   16k-Read-30-14200-223 + 512k-Write-1-129-65
   32k-Read-30-10500-328 + 512k-Write-1- 69-34
   64k-Read-30- 6950-435 + 512k-Write-1- 10- 5

6. 512k write request split into 64k chunks:
   4k-Read-30-16700- 65 + 512k-Write-1-184-92
   8k-Read-30-13400-105 + 512k-Write-1-165-82
   16k-Read-30-10800-172 + 512k-Write-1-146-73
   32k-Read-30- 8300-259 + 512k-Write-1-123-61
   64k-Read-30- 6300-394 + 512k-Write-1- 39-20

8. 4k write requests with 16 queue depth:
   4k-Read-30-19000- 77 + 4k-Write-16-22900-89
   8k-Read-30-15250-119 + 4k-Write-16-20700-81
   16k-Read-30-12100-190 + 4k-Write-16-18100-70
   32k-Read-30- 9200-287 + 4k-Write-16-10800-42
   64k-Read-30- 6000-372 + 4k-Write-16- 4400-17

FIG. 1C

INTERLEAVING READ AND WRITE REQUESTS TO REDUCE LATENCY AND MAXIMIZE THROUGHPUT IN A FLASH STORAGE DEVICE

CROSS-REFERENCES TO RELATED APPLICATIONS

This application is a continuation of and claims priority to and the benefit of U.S. patent application Ser. No. 14/575,103, filed on Dec. 18, 2014, entitled "Efficient Scheduling of Input/Output Requests to Reduce Latency and maximize Throughput in a Flash Storage Device," which is hereby incorporated by reference in its entirety for all purposes.

BACKGROUND

1. Field of the Invention

The present embodiments relate to methods, systems, and programs for managing read and write requests in a storage system.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage.

Some network storage devices have hard drives and solid state drive (SSD) drives, and are referred to as hybrid storage systems. Other, more recent, network flash storage devices include only SSD drives. Existing kernel IO schedulers are not well suited for SSD-only storage devices because SSD drives have unique characteristics that are different from traditional hard drives. For example, in SSD drives, the write latency is usually several orders of magnitude greater than the read latency (e.g., 5 to 1, 10 to 1). This means that multiple pending write requests of the size that the user has given can increase the read latency significantly.

What is needed is a network storage device having SSD drives with schedulers that minimize the read latency and maximize the write throughput.

It is in this context that embodiments arise.

SUMMARY

The present embodiments relate to methods, systems, and programs for managing read and write requests in a storage system, and more specifically, managing read and write requests in an all-flash storage system.

In one embodiment, a storage device includes a processor, a solid state drive (SSD), and a scheduler module. The SSD has a performance value for completing write requests and read requests, and the scheduler module has program instructions for execution by the processor. The chunklet size is predetermined based on the performance value, and the scheduler module is operable to schedule write requests and read requests received by the storage device for processing by the SSD. Additionally, the scheduler module further includes a chunklet processor module, and the chunklet processor module is operable to determine if a size of a write request is greater than the chunklet size. Further, the chunklet processor module is further operable to send to the SSD the write request when the size of the write request is not greater than the chunklet size, and send to the SSD a segment from the write request when the size of the write request is greater than the chunklet size, where the segment has a segment size equal to the chunklet size.

In another embodiment, more than one write requests are sent to the SSD for simultaneous processing, as long as the sum of the size of all the pending write requests is less than or equal to the write chunklet size.

In another embodiment, a method includes an operation for identifying a performance value for completing write requests and read requests by a solid state drive (SSD), the SSD being part of a storage device including a scheduler module. The scheduler module is operable to schedule write requests and read requests received by the storage device for processing by the SSD, and the scheduler module includes a chunklet processor module, and the chunk size is predetermined based on the performance value. The method further includes an operation for determining, by the chunklet processor module, if a size of a write request is greater than the chunklet size. Further yet, the method includes operations for sending to the SSD the write request when the size of the write request is not greater than the chunklet size, and for sending to the SSD a segment from the write request when the size of the write request is greater than the chunklet size, the segment having a segment size equal to the chunklet size.

In one embodiment, a non-transitory computer-readable storage medium storing a computer program is presented. The computer-readable storage medium includes program instructions for identifying a performance value for completing write requests and read requests by a solid state drive (SSD). The SSD is part of a storage device including a scheduler module, and the scheduler module is operable to schedule write requests and read requests received by the storage device for processing by the SSD. Further, the scheduler module includes a chunklet processor module. The chunklet size is predetermined based on the performance value. The storage medium further includes program instructions for determining, by the chunklet processor module, if a size of a write request is greater than the chunklet size. In addition, the storage medium further includes program instructions for sending to the SSD the write request when the size of the write request is not greater than the chunklet size, and program instructions for sending to the SSD a segment from the write request when the size of the write request is greater than the chunklet size. The segment has a segment size equal to the chunklet size.

It should be appreciated that the present embodiments can be implemented in numerous ways, such as a method, an apparatus, a system, a device, or a computer program on a computer readable medium. Several embodiments are described below.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 1C shows the results for testing throughput with different write requests, according to one embodiment.

DETAILED DESCRIPTION

The following embodiments describe methods, devices, systems, and computer programs for managing read and write requests in a storage system. In an all-flash storage device, write requests can take about 9 to 10 times longer than a read request of the same size. There could be several problems when reading or writing from all-flash storage, such as a large write request slowing down small read requests, or other write requests. Also, a large read request may slow down smaller read requests by filling the incoming requests queue.

In one embodiment, a determination is made on what is the maximum size of a write request to flash storage that improves the throughput of a flash chip (e.g., write requests beyond a certain value do not improve throughput). A chunklet is defined as a block of data having the calculated maximum size. In one embodiment, as incoming read and write requests come in, the write requests are broken into chunklets, and then the chunklets are queued for processing by the flash chip. One chunklet per write request is processed at a time. In other embodiments, a predetermined number of write chunklet-size write requests may be outstanding. This way, a write request does not monopolize the use of the flash chip for a period of time, allowing other requests (read or write) to be queued while the chunklet is being processed by the all-flash storage.

It will be apparent, that the present embodiments may be practiced without some or all of these specific details. In other instances, well-known process operations have not been described in detail in order not to unnecessarily obscure the present embodiments.

Figure 1A:
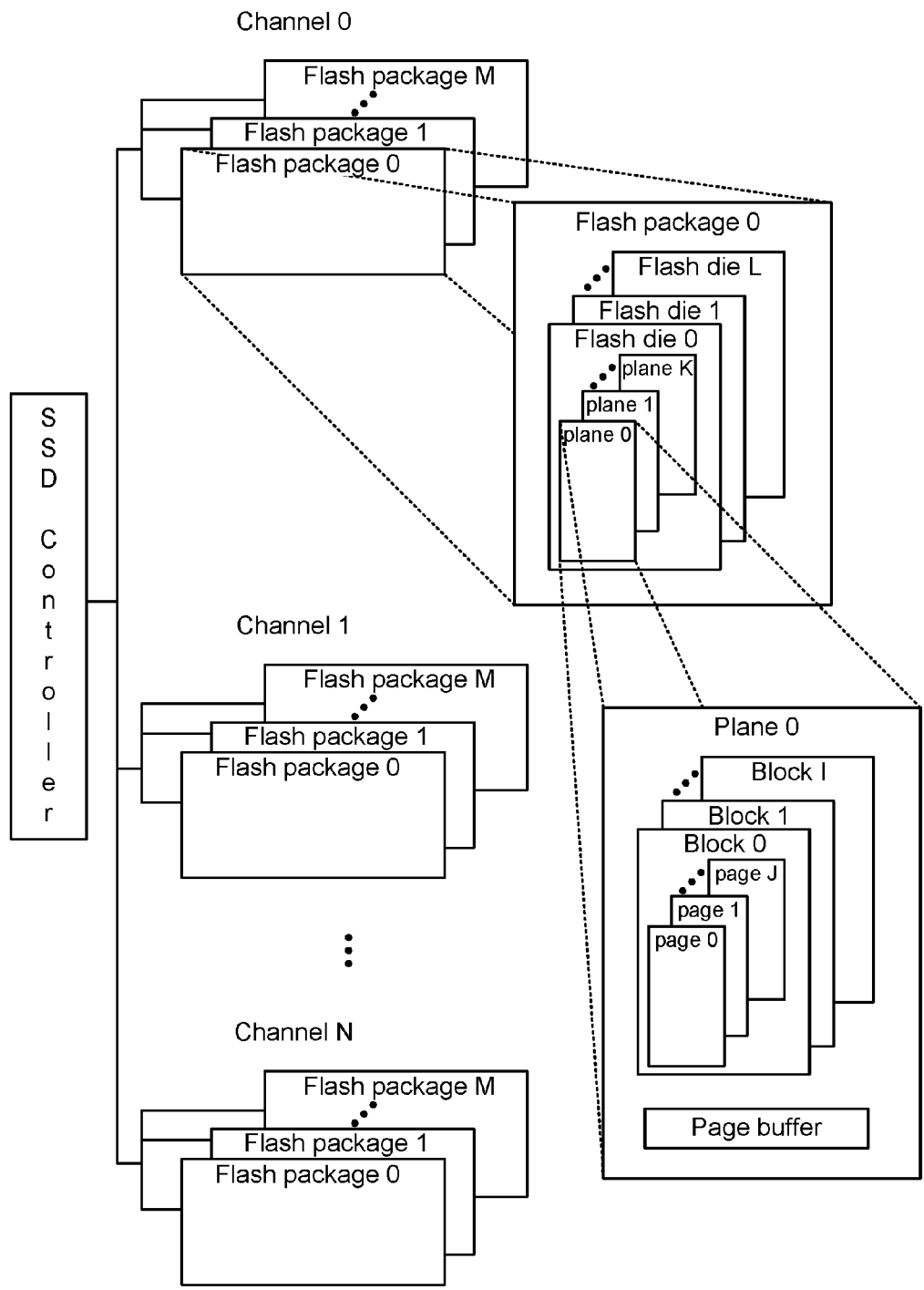
FIG. 1A illustrates operations of a solid state drive (SSD) memory, according to one embodiment.

FIG. 1A illustrates operations of a solid state drive (SSD) memory, according to one embodiment. In one embodiment, an SSD includes multiple channels with each channel having one or multiple flash chips 102.

Each flash cell in a flash chip consists of a floating gate transistor, that can be programmed with one from a number of 'n' voltage levels. In some embodiments, the value of n may be 2 for SLC flash, 4 for MLC flash, 8 for TLC flash, but other values of n are also possible. In the case of SLC, each flash cell represents one bit of storage, and once data is written in the cell, the data can be read any number of times, but to overwrite the data, the flash cell needs to be erased first, and then the cells can be programmed with new data.

Flash cells can be packaged as NOR cells or as NAND cells. With NOR, data can be addressed with a granularity of bytes, and they need more transistors to achieve this byte-level granularity, making them expensive.

With NAND, flash cells are organized into pages, where each flash page can be individually read and written to. Nowadays, flash page sizes can be from about 2 KBytes to 16 KBytes depending on the flash vendor and the model. Flash pages are further organized into flash blocks, where a flash block consists of J number of flash pages.

In some flash chips, the size of the flash block is in the range from about 128 Bytes to 2 MBytes, although other values are also possible. In some implementations, the flash block is the unit for erasing data. and the flash page is the unit for reading and writing data.

From the life cycle point of view, once a flash page is written, it can be read any number of times, but to re-write the data in the flash page, the whole flash block needs to be erased first.

In some embodiments, SSDs use NAND flash, and each flash cell can be either SLC, MLC, or TLC. An SSD may have a number N of channels, and each channel has a number M of flash packages. Within each flash package, there can be a number L of dies, and in each die there can be a number K of planes. Each flash plane has I flash blocks, and each flash block has J pages.

Each plane can take a command to read or write a flash page and is operated independently of other flash planes. When the plane takes a read command, the plane reads the flash page into its local page buffer, and the data is transferred from this local page buffer to the SSD controller using the channel bus. It is noted that the channel bus is shared by all the flash packages. Each flash plane can also take a command to erase the flash block.

To read a page, it typically takes about 50 µs. To write a flash page it takes about the order of 1 to 1.5 milliseconds. To erase a flash block, it takes in the order of 4 to 5 milliseconds. Therefore, writing the flash page and erasing the flash block is much slower than reading the flash page. From each flash plane, we can write about 666 to 1000 flash pages per second. Assuming each flash page size is about 4 KB in size, then about less than 4 MegaBytes per second write throughput from each flash plane is obtained.

To maximize the write throughput beyond this 4 MB/sec, SSDs typically stripe the write request among all the possible flash planes. For example SSDs first stripe the data across channels (N) (channel parallelism), then SSDs stripe across flash packages (M) (way parallelism), then SSDs stripe across flash dies (L), and then SSDs stripe across flash planes (K). By doing this, SSDs can get a write throughput of (N*M*L*K*40 MB/sec). The striping granularity across flash planes is about the flash page size. Some of the SSDs might choose to limit the write striping to some upper limit, though the actual flash parallelism is high.

Looking to the write throughput as a function of the write request size, the write throughput can go up until the write request has a size of (N*M*L*K*flash_page_size), and after that the write request saturates the SSD. It is noted that, this excludes the SSD garbage collection overhead, which deals with erasing the flash blocks. In reality the actual value of the maximum write request size, where you get the max write throughput, is typically less than (N*M*L*K*flash_page_size), because of the erase requests coming from the SSD's internal garbage collection. In one embodiment, this maximum throughput for the write request size, where we see the saturation of write throughput, as the write chunklet size.

When considering write requests, as long as one or more write requests are submitted, where the sum of all the write requests sizes submitted is at least equal to the write chunklet size, then write throughput is being maximized.

For example, assuming a write chunklet size of 64 KB, if there are two write requests of size 64 KB each, then there won't be a major difference in the write throughput whether both write requests are submitted together, or whether they are submitted one at a time, i.e., the system waits for the first request to complete before submitting the second one, assuming the CPU overhead in completion and resubmission of the request is negligible.

In another scenario, assuming a write chunklet size of 64 KB, and there are two write requests of 32 KB each, then it is better to submit these two write requests together to maximize the write throughput.

From the reads point of view, SATA SSDs typically accept 32 commands, although other values are also possible. Among these 32 commands, if there are many write requests, and a read request is behind these write requests, and these write requests happen to go to the same plane that the read needs to go to. Then the read request will have to wait for all those writes to complete, which is quite a long wait, given that the writes are much slower than reads.

As described in more detail below, in some embodiments, there are guarantees that the SSD scheduler wants to provide: maximizing the write throughput, and reducing the read request latency without sacrificing the write throughput. In one embodiment, to accomplish these goals, the SSD schedules as many reads as possible, but for writes, the sum of the size of all the write requests issued to the SSD at one time is equal than or less then the write chunklet size. This way, each flash plane gets a maximum of one flash page write request only. That is, the read requests that are issued to the SSD need to wait for just one flash page write request to complete.

Figure 1B:
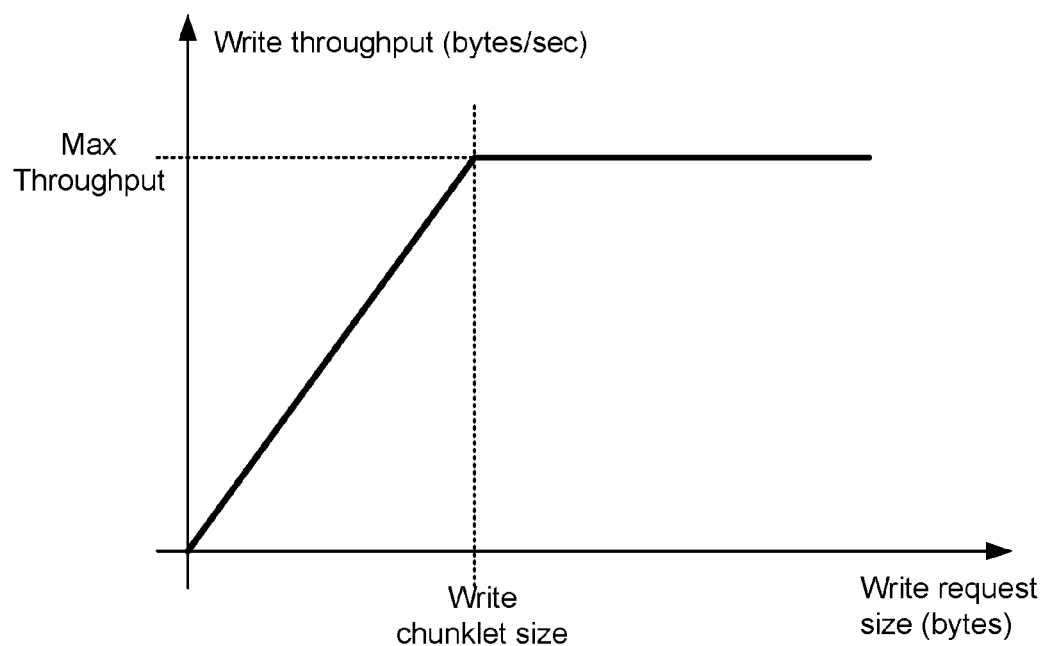
FIG. 1B illustrates the throughput of the SSD memory based on write-request size, according to one embodiment.

FIG. 1B illustrates the throughput of the SSD memory based on write-request size, according to one embodiment. Sometimes, the level of parallelism supported by the SSD chip is not provided by the SSD manufacturer. In one embodiment, a test is made to determine this maximum rate of processing in parallel by the SSD chip. In other words, what is the maximum rate for writing data or what is the maximum rate for reading data.

In one embodiment, a method to measure the performance of an SSD chip includes sending write requests of different sizes to the SSD until the maximum throughput is identified. For example, a write request of 4 kB is sent to the SSD and the throughput is measured. Then, another request with a bigger size (e.g., 8 KB) is sent, and the throughput is measured again. The write request sizes are increased until the increase of the request size does not improve the measured throughput performance (e.g., how many megabytes per second the SSD is providing). More details are provided below with reference to FIG. 1C to illustrate some test results for measuring throughput performance.

The chart in FIG. 1B illustrates how the throughput increases with the request size, until a maximum throughput level is reached (e.g., 64 kB). After that, write requests bigger than 64 kB do not improve the throughput beyond the 64 kB request. There is no benefit in sending write requests larger than the maximum throughput size to the SSD because the throughput will not improve. Similar same testing may also be performed for read requests to determine the maximum read throughput.

FIG. 1C shows the results for testing throughput with different write requests, according to one embodiment. A plurality of tests were performed on a particular SSD chip, and the resulting throughputs where measured. It is noted that other SSD chips may provide different results, based on their performance.

For each test, five values are identified: request size 122, request type 124 (e.g., read or write), queue depth 126, I/Os per second (IOPS) 128, and throughput 130. In some tests, the write requests are broken into smaller requests that are processed separately. In one embodiment, the read requests are not broken into smaller segments for processing.

The smaller write requests are referred to herein as chunklets, which have a chunklet size (e.g., 64 kB). Of course, if a write request is smaller than the chunklet size, then the whole write request is sent to the SSD. The results show that, for the tested SSD chip, using write requests of 32 KB is optimal for getting balanced read and write IOPS in this SSD chip. In one embodiment, the chunklet size for this chip would be set to 32 KB.

Figure 2:
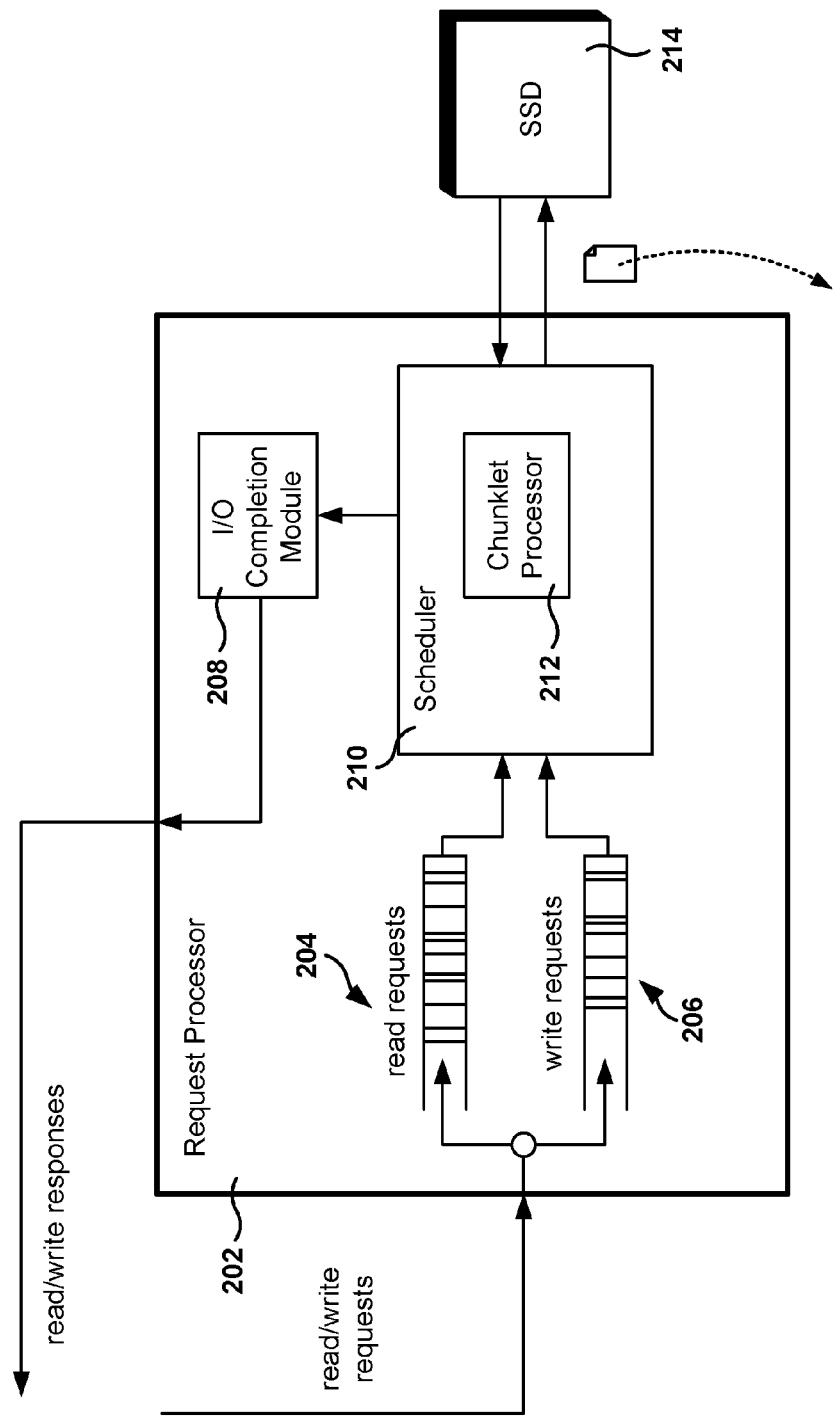
FIG. 2 illustrates an architecture of a request processor for managing read and write requests for an SSD, according to one embodiment.

FIG. 2 illustrates an architecture of a request processor for managing read and write requests for an SSD, according to one embodiment. In one embodiment, once the maximum throughput of the SSD is determined, a chunklet is defined as an amount of data having the size of the maximum throughput. In one embodiment, in order to avoid starvation (e.g., long delays) of read requests, the write requests having a size bigger than the chunklet is divided into a plurality of requests of chunklet size or smaller, which are also referred to herein simply as chunklets.

At any point in time, many types of applications may be accessing the storage device, sending read and write request of different request sizes. The goal of the storage system scheduler is to maximize throughput while providing low latency. As discussed above, the write latency can be about 20 times the read latency. Further, there is no performance improvement by submitting requests bigger than the chunklet size, because no additional throughput is obtained. However, the advantage of submitting a write request in chunklet size is that other smaller requests (e.g., read requests) may be scheduled in the SSD without having to wait for the large write request to complete. In some embodiments, large read requests are also broken into chunklets.

The benefits of breaking requests into chunklets include: preventing multiple block writes from starving block reads, preventing large block writes from starving small block reads, and preventing large block reads from starving small block writes.

In one embodiment, the storage device includes a request processor 202 that receives read and write requests, schedules the read and write requests to be sent to SSD 214, and then completes the read and write requests by sending responses to the read and write requesters.

In one embodiment, the request processor includes read requests queue 204 and write requests queue 206. In another embodiment, a single queue is used for holding incoming read and write requests. The request processor further includes scheduler 210 and I/O completion module 208. It is noted that the embodiments described herein may be utilized in hybrid arrays with SSD's and hard drives, as well as in all-SSD storage devices without hard drives, also referred to as all-flash storage arrays.

The scheduler 210 selects read requests and write requests from their respective queues and schedules them for processing, which includes transferring the scheduled requests, or chunklets of the I/O requests, to the SSD. Scheduler 210 may utilize algorithms for fair scheduling of the incoming requests based on system parameters, such as priority of the request, fairness, use of SSD, quality of service (QOS), etc.

Scheduler 210 includes a chunklet processor 212 that manages the operations related to chunklets, including breaking write requests into chunklets for processing, when the write requests are greater than the chunklet size. In some embodiments, the chunklet processor 212 also breaks large read requests (i.e., read requests larger than the chunklet size) into chunklet-size segments of the read requests before sending the requests to the SSD 214.

Chunklet processor 212 sends the requests to the SSD, utilizing the interface provided by the SSD, such as SATA, SCSI, SAS, etc. More details about the chunklet processor 212 are provided below with reference to FIGS. 3 and 4.

Some of the embodiments described herein break write request into chunklets and then one chunklet of the write request is processed at a time, which means that the next chunklet is not requested from the SSD until the previous chunklet is processed by the SSD. However, in other embodiments, more than one chunklet-size write request may be transferred at a time (e.g., two chunklets). Additionally, in some embodiments a predetermined threshold is determined, where if a write request is smaller than the threshold then the write request is not broken into chunklets. For example, if a write request is about two times the chunklet size, it may be faster just to let the SSD scheduler deal with the write request, saving the resources required for processing the overhead of breaking the write request into two different requests. The predetermined size may be determined by the system administrator or the system designer, and may vary from one time the chunklet size to 10 times the chunklet size, or some other predetermined value.

It is noted that the embodiments illustrated in FIG. 2 are exemplary. Other may utilize different number of queues for I/O requests, provide a single queue for read and write requests, or combine the functionality of several modules into one, etc. The embodiments illustrated in FIG. 2 should therefore not be interpreted to be exclusive or limiting, but rather exemplary or illustrative.

Figure 3:
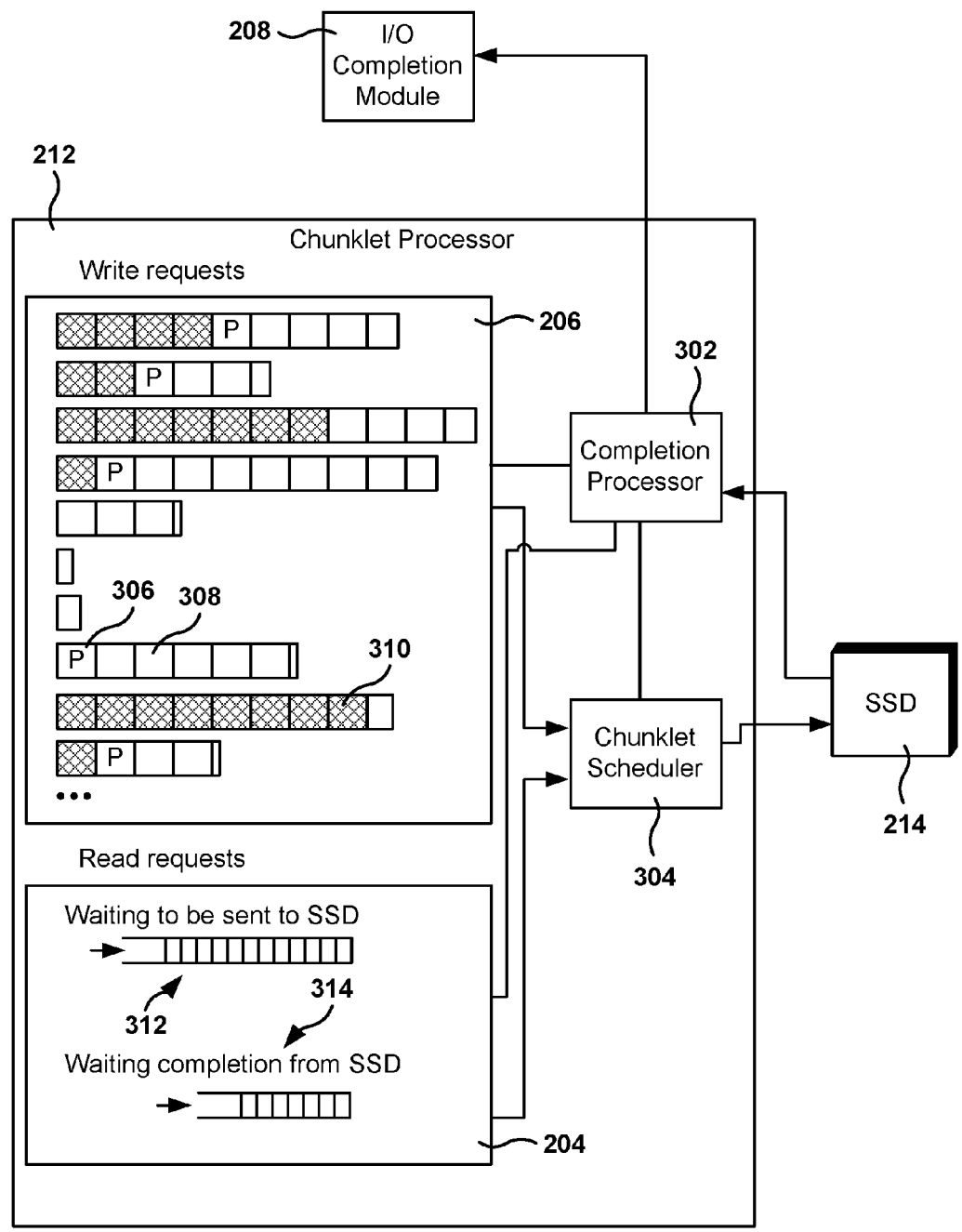
FIG. 3 illustrates an embodiment of a chunklet processor.

FIG. 3 illustrates an embodiment of a chunklet processor 212. As discussed above, the SSD does not provide any additional parallelism beyond a certain request size, which is referred to herein as a chunklet. For example, in a channel-first page allocation method, the chunklet size is C*P, where C is the number of channels and P is the page size. In a way-first page allocation method, the chunklet size is C*W*P, where C is the number of channels, W is the number of ways, and P is the page size.

In one embodiment, in order to prevent large block writes from starving small block reads, the large write request is split into multiple write requests of chunklet size or less (e.g., the last segment to be written from the large write request may not necessarily be of chunklet size, unless the write request happens to be an exact multiple of the chunklet size). The multiple write requests are then interleaved with incoming read requests. This method avoids read-request starvation without degrading the write throughput.

When processing the large write request, the chunklets from the write request are not sent to the SSD at the same time; only one chunklet is sent at a time. When the chunklet operation is completed, then the next chunklet is sent to the SSD until all chunklets are processed.

Chunklet processor 212 includes a memory 206 for tracking the processing of write requests. The person skilled in the art would readily appreciate that the memory may hold the write requests or may hold pointers to another memory where the write request data is kept in the network storage device.

In the exemplary embodiment of FIG. 3, memory 206 includes a plurality of write requests waiting to be processed. When the write requests have a size bigger than the chunklet, the write requests are broken into chunklet-size requests (e.g., 306, 308, and 310). The chunklet scheduler 304 takes one chunklet at a time, or a request that is smaller than a chunklet, and then forwards the chunklet to the SSD 214. In FIG. 3, the chunklets being processed 306 are marked with a "P" within the write requests memory 206, chunklets waiting to be processed 308 are shown without shading, and chunklets already processed 310 are shown with shading.

The completion processor 302 manages messages from the SSD 214 when an I/O request has been completed. If the request is associated with a write request having multiple chunklets, the completion processor 302 marks the chunklet as completed 310 and identifies the write request associated with the chunklet completion as ready to be re-scheduled by chunklet scheduler 304.

If the completion is for the last chunklet of the write request or for a write request that is smaller than a chunklet, the completion processor 302 notifies the I/O completion module 208 that the write request has been completed.

The read request memory 204 includes information about the read requests 312 waiting to be sent to the SSD and the read requests 314 that have been sent to the SSD and are waiting for completion. Once a read request is completed, the completion processor 302 removes the completed read request from queue 314 and notifies I/O completion module 208 that the request has been completed.

In the embodiment of FIG. 3, there could be several chunklets from several write request processed in parallel, but in another embodiment, only one chunklet at a time from all pending write requests is sent to the SSD. In this case, when a chunklet is completed, the chunklet scheduler 304 selects one chunklet from any of the write requests waiting to be processed, or a write request that is smaller than a chunklet.

In another embodiment, in order to prevent multiple block writes from starving a block read, the number of write requests is limited to avoid the starvation of read requests. New write requests are not submitted to the SSD when the pending write requests to the SSD have a total size greater than the chunklet size. This means that read requests are not starved because the write requests queue depth is limited based on the chunklet size.

In another embodiment, the write request queue depth is limited. In yet another embodiment, the size of all write requests that may be processed together is less than or equal to that of the chunklet size.

In one embodiment, the write requests do not stop the read requests from being queued at the SSD. While a write request is waiting for the chunklet to be completed, the incoming reads are queued to the SSD.

In another embodiment, the chunklet scheduler 304 may send more than one chunklet from the same write request to the SSD at a time. It takes at time Tc to send a request from the chunklet processor 212 to the SSD 214, and a time Tr to process the request by the SSD. Depending on the relationship between Tc and Tr, it may be more efficient to send more than one chunklet in order to keep the pipeline full. For example, if Tr is greater than Tc, the chunklet scheduler 304 may send two chunklets at a time to the SSD. When the SSD marks one of the chunklets complete, the other chunklet may be processed at that time, and the chunklet scheduler 304 sends another chunklet to the SSD, so when the chunklet being processed is served, the SSD has already another chunklet waiting for processing.

Figure 4:
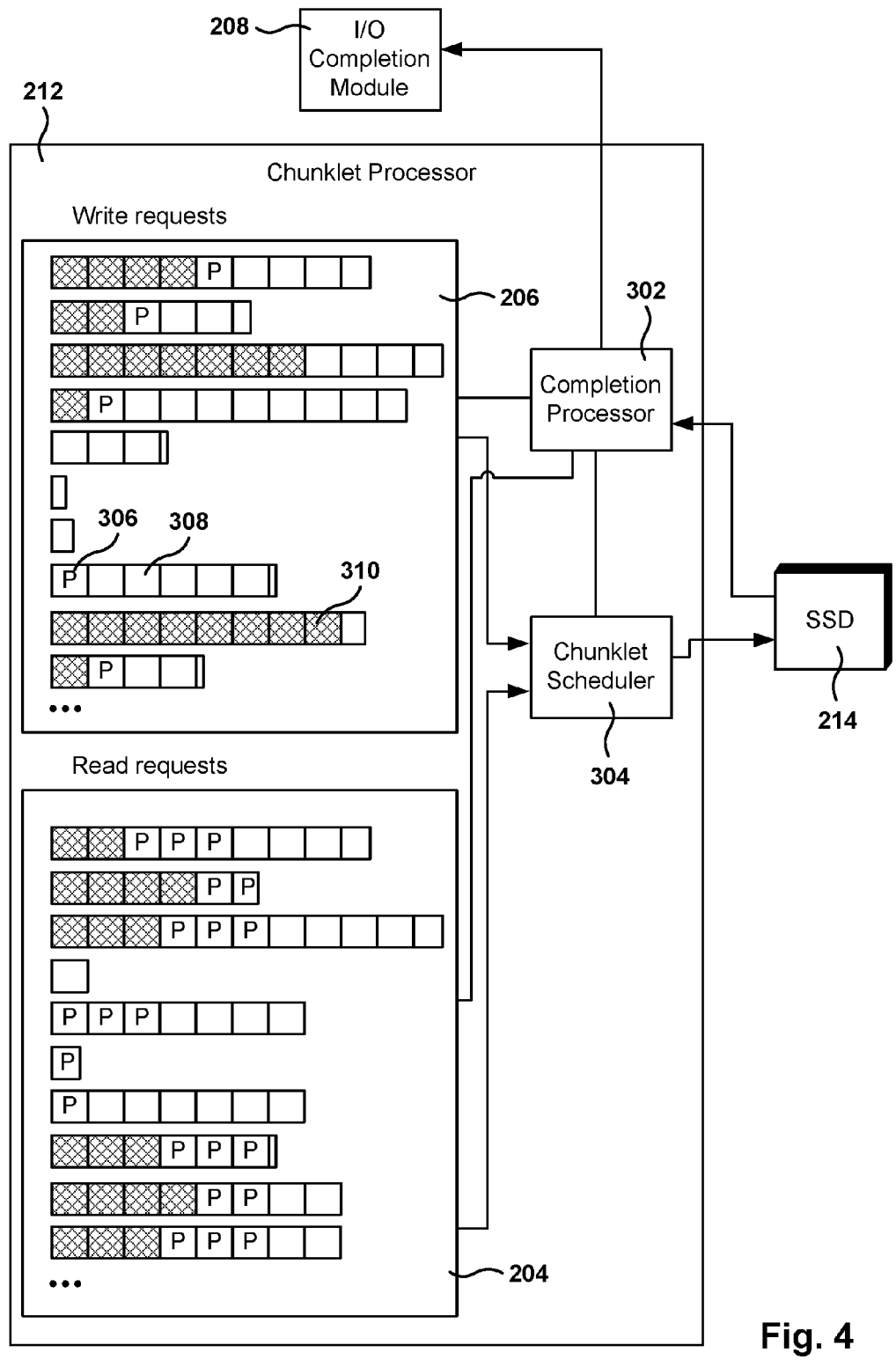
FIG. 4 illustrates another embodiment of a chunklet scheduler where read requests are segmented for processing.

FIG. 4 illustrates another embodiment of a chunklet scheduler 212 where read requests are segmented for processing by the SSD. In one embodiment, read requests greater than the chunklet size are also broken into chunklets before being sent to the SSD. Sometimes, a large read request (e.g., 10 times the chunklet size), may starve other smaller read requests, or other write requests, for SSD processing.

Read requests are processed much faster than write requests by the SSD, so in one embodiment, the reads are broken into chunklets and then all the chunklets are queued to the SSD. That is, the chunklet scheduler 304 does not wait for one chunklet from a read request to be completed before sending the next one.

In another embodiment, the maximum number of chunklets from a read request that are processed simultaneously is a predetermined value. For example, in the exemplary embodiment of FIG. 4, the chunklet scheduler 304 schedules up to 3 chunklets at a time from the same read request.

In yet another embodiment, the chunklet scheduler 304 identifies a maximum number of simultaneous requests for a read request, but if there are no other read requests waiting, the chunklet scheduler 304 sends additional chunklets to the SSD. That is, if there is congestion, only a predetermined number of chunklets are processed simultaneously, but in the absence of congestion, more chunklets can be processed simultaneously.

In one embodiment, the maximum number of chunklets to be processed simultaneously (either for reads or for writes) is based on the queue size at the SSD. For example, if the SSD 214 has a queue that holds up to 32 requests, the chunklet scheduler 304 may set up a number based on the queue size. For example, if the queue has a size of 32, the chunklet scheduler 304 may set up a maximum of three chunklet-size write requests and unlimited number of read requests, or 6 write requests at a time and 26 read requests, etc.

Figure 5A:
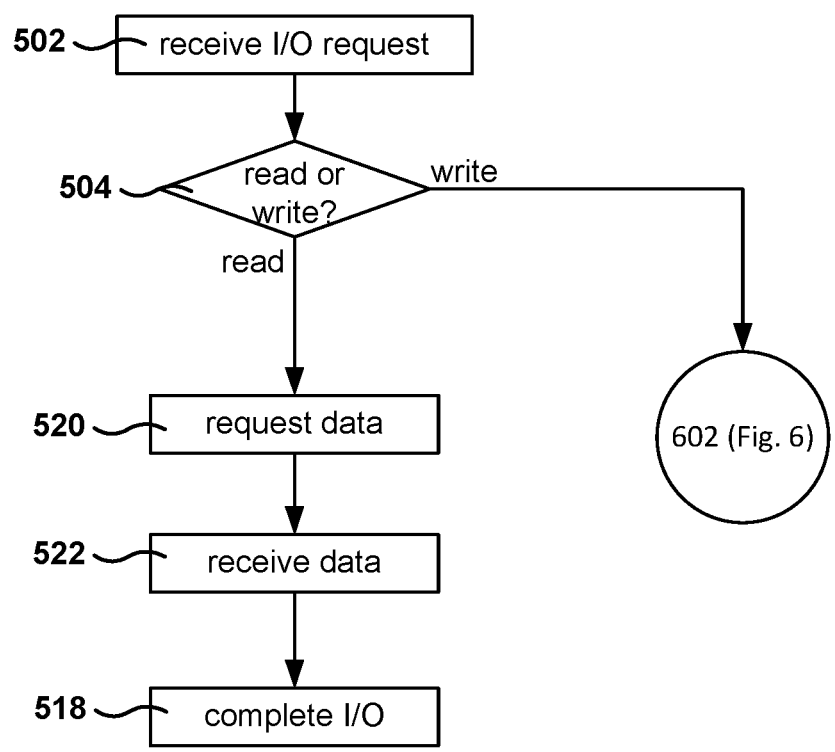
FIG. 5A-5B are flowcharts of methods for processing I/O requests, according to several embodiments.
Figure 5B:
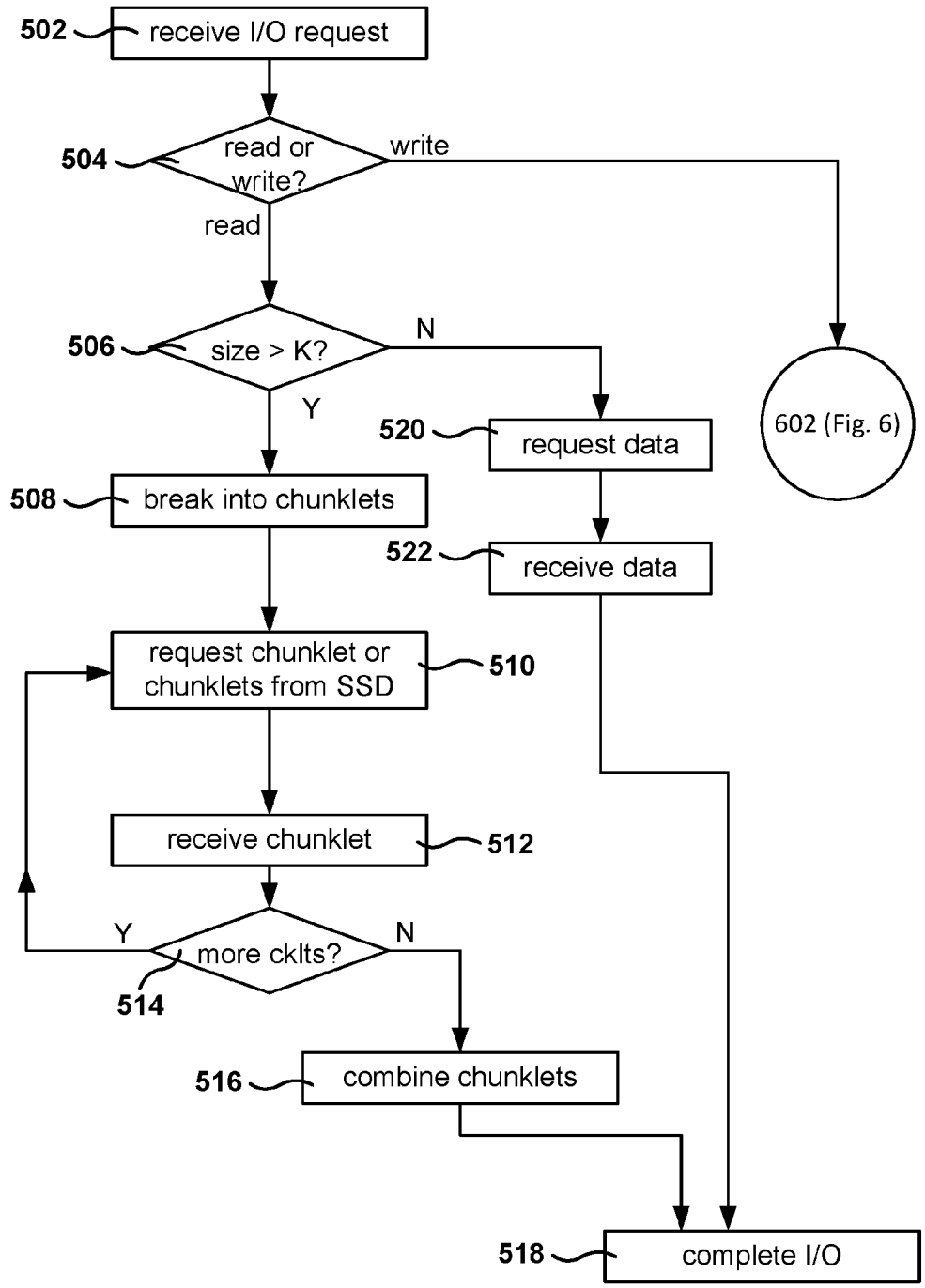

FIG. 5A-5B are flowcharts of methods for processing I/O requests, according to several embodiments. While the various operations in these flowcharts are presented and described sequentially, one of ordinary skill will appreciate that some or all of the operations may be executed in a different order, be combined or omitted, or be executed in parallel.

Regarding FIG. 5A, in operation 502 an I/O request is received by the storage device. In operation 504, a check is made to determine if the I/O request is a read request or a write request. If the I/O request is a write request, the method flows to operation 602 of FIG. 6, and if the I/O request is a read request, the method flows to operation 520, where the data for the read request is requested from the SSD.

From operation 520, the method flows to operation 522 where the data is received from the SSD, and from operation 522 the method flows to operation 518 where a completed I/O notification is provided to the application that requested the read data.

FIG. 5B is a flowchart for an embodiment where large read requests (e.g., bigger than chunklet size) are broken into segments or chunklets for processing by the SSD. Therefore, operations 502 and 504 are the same as the ones described above with reference to FIG. 5A. However, in operation 506 a check is made to determine if the read request is greater than a predetermined value K. In one embodiment, K is equal to the chunklet size, but in other embodiments the value of K may be different. For example, in some embodiments K is equal to 1.5 times the chunklet size, and write requests are only broken into chunklets if the write requests are greater than 1.5 times the chunklet size. In other embodiments, K may have other values, such as in the range from 1 to 10, or greater.

If the size of the read request is greater than K, the method flows to operation 508, and if the size of the read request is not greater than K then the method flows to operation 520.

In operation 508, the read request is broken into chunklet-size requests to be sent to the SSD, and in operation 510 the chunklet-size request is sent to the SSD. From operation 510, the method flows to operation 512 where the chunklet is received, and from operation 512 the method flows to operation 514 where a check is made to determine if there are more chunklets from the read request to be processed. If there are more chunklets, the method flows back to operation 510 to request the next chunk, and if there are no more chunklets, the chunklets associated with a read request are combined into a single unit in operation 516. From operation 516, the method flows to operation 518 where the I/O is completed.

In operation 520, the data is requested for the read request having a size smaller than K. From operation 520, the method flows to operation 522 where the data is received, and from operation 522 the method flows to operation 518.

Figure 6A:
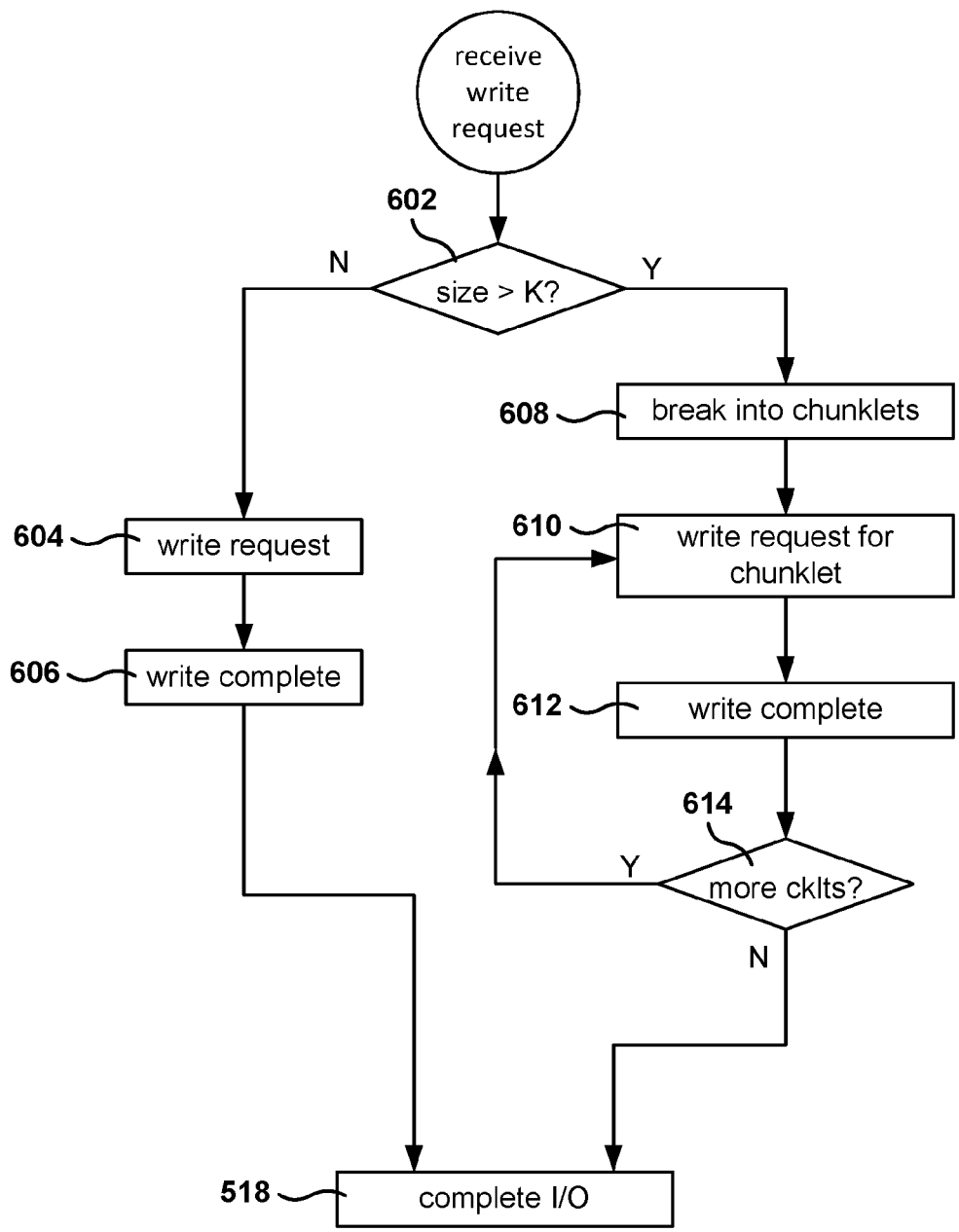
FIG. 6A is a flowchart of a method for processing write requests, according to one embodiment.
Figure 6B:
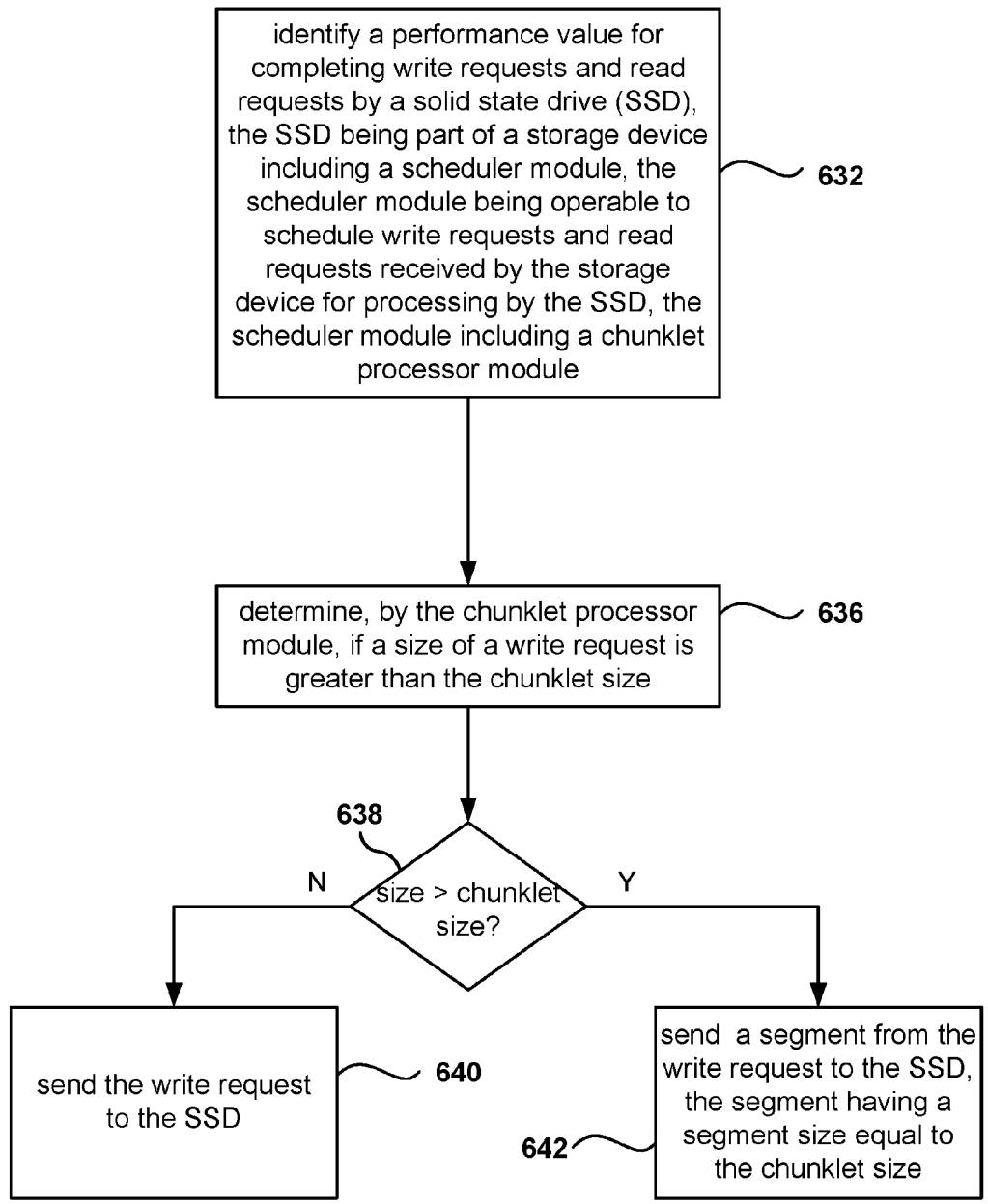
FIG. 6B is a flowchart of a method for managing read and write requests in a storage system, according to one embodiment.

FIG. 6A is a flowchart of a method for processing write requests, according to one embodiment. While the various operations in flowcharts of FIGS. 6A and 6B are presented and described sequentially, one of ordinary skill will appreciate that some or all of the operations may be executed in a different order, be combined or omitted, or be executed in parallel.

FIG. 6A illustrates the method for processing a write request. In operation 602, a check is made to determine if the size of the write request is greater than a predetermined value K. As in the case of read requests, the value of K may be 1 chunklet or may be some other value. In one embodiment, the parameter K used for determining when to break up read requests may be the same, or may be different, from the parameter used for determining when to break write requests.

If the size of the write request is greater than K, the method flows to operation 608, and if the size of the write request is not greater than K, the method flows to operation 604, where the write request is sent to the SSD.

From operation 604, the method flows to operation 606 where the write completion notification is received. From operation 606, the method flows to operation 518 to complete the I/O request.

In operation 608, the write request is broken into chunklet-size request, also referred to herein as chunklets. In operation 610, a write request for a chunklet is sent to the SSD. From operation 610, the method flows to operation 612 where the write request is completed for the chunklet. In operation 614, a check is made to determine if there are more chunklets pending for the write request, and if there are more chunklets pending, the method flows to operation 610 or to operation 614 otherwise.

In operation 614, a check is made to determine if there are more chunklets pending for a write request. If there are more chunklets pending, the method flows back to operation 6102 to request the next chunklet. If there are no more chunklets pending, the method flows to operation 518 to complete the I/O request.

FIG. 6B is a flowchart of a method for managing read and write requests in a storage system, according to one embodiment. Is noted that the embodiments presented herein may be used for storage devices that are hybrid devices having hard drives and SSDs, as well as in storage devices that are all-flash devices (which do not have hard drives).

Operation 632 is for identifying a performance value for completing write requests and read requests by a solid state drive (SSD). The SSD is part of a storage device that includes a scheduler module, and the scheduler module is operable to schedule write requests and read requests received by the storage device for processing by the SSD. Additionally, the scheduler module includes a chunklet processor module.

From operation 632, the method flows to operation 636 for determining, by the chunklet processor module, if the size of a write request is greater than the chunklet size. If the size of the write request is greater than the chunklet size 638, the method flows to operation 642, and if the size of the write request is not greater than the chunklet size the method flows to operation 640.

In operation 640, the write request with the size not greater than the chunklet size is sent to the SSD. In operation 642, a segment from the write request is sent to the SSD, the segment having a segment size equal to the chunklet size.

In one embodiment, the segment has a segment size equal to the chunklet size, but in other embodiments the segment may have a size greater than, or a smaller than, the chunklet size. In another embodiment, the operations of the method are executed by a processor.

Figure 7A:
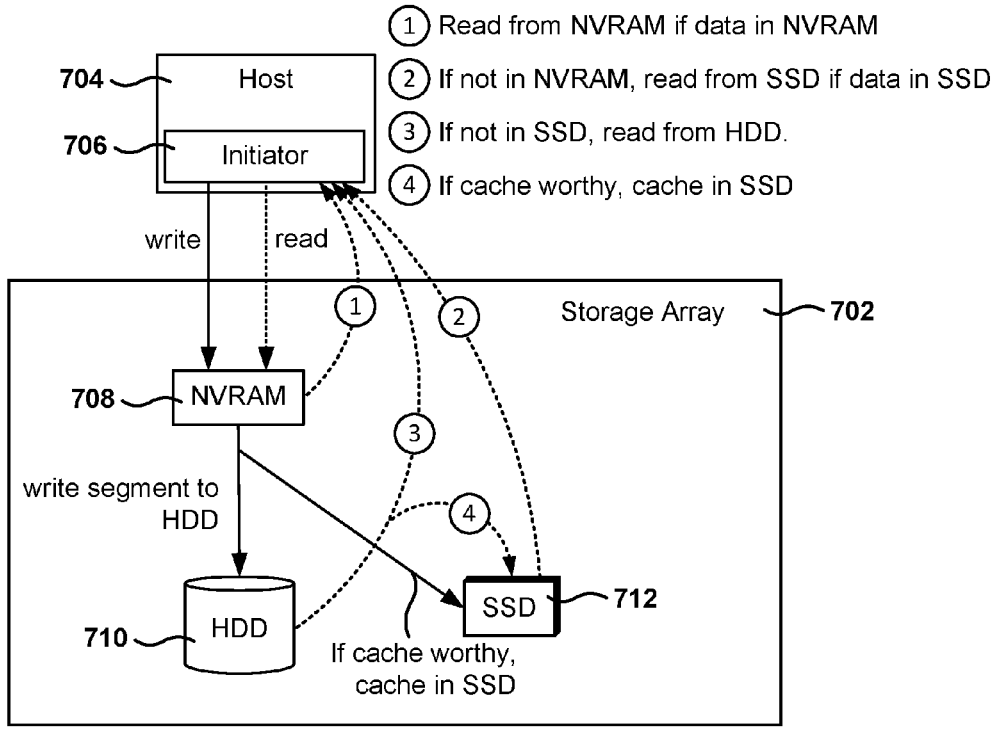
FIGS. 7A-7B illustrate the read and write paths within the storage array, according to several embodiments.
Figure 7B:
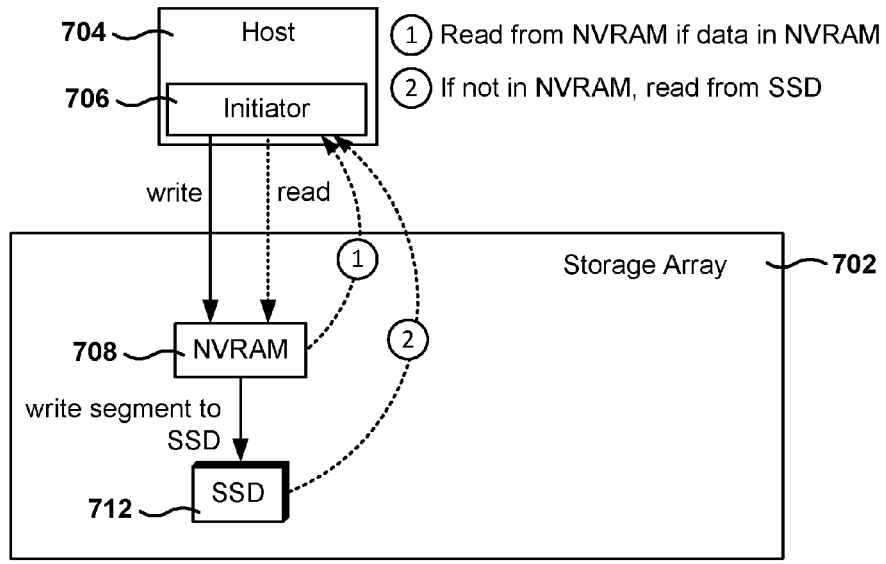

FIGS. 7A-7B illustrate the read and write paths within the storage array, according to several embodiments. FIG. 7A shows the write path for a hybrid system with SSDs and HDDs, where the initiator 244 in the host 204 sends the write request to the storage array 202. As the write data comes in, the write data is written into NVRAM 218, and an acknowledgment is sent back to the initiator (e.g., the host or application making the request). In one embodiment, storage array 202 supports variable block sizes. Data blocks in the NVRAM 218 are grouped together to form a segment that includes a plurality of data blocks, which may be of different sizes. The segment is compressed and then written to HDD 226. In addition, if the segment is considered to be cacheworthy (i.e., important enough to be cached or likely to be accessed again) the segment is also written to the solid state drive (SSD) cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 202. The requested data may be found in any of the different levels of storage mediums of the storage array 202. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

FIG. 7B illustrates the read and write paths for an all-flash array having SSDs for permanent storage and no HDDs. The write path includes writing the incoming data to NVRAM 708 and later saving the data in SSD 712. The read path is also simplified as compared to the hybrid system of FIG. 7A, where the data is read from NVRAM 708 if available in NVRAM, and if the data is not found in NVRAM 708 then the data is read from SSD 712.

Figure 8:
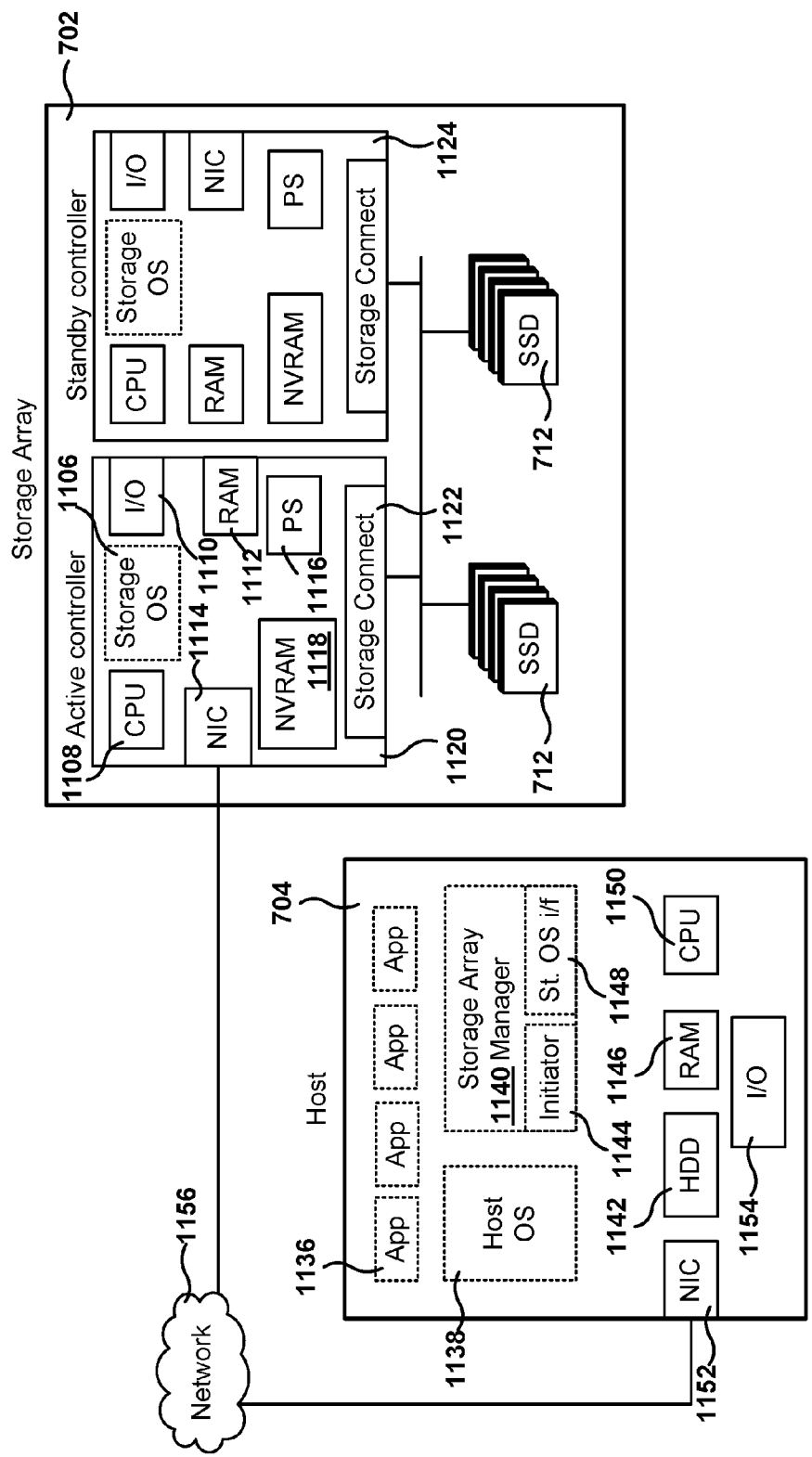
FIG. 8 illustrates the architecture of an all-flash storage array, according to one embodiment.

FIG. 8 illustrates the architecture of an all-flash storage array, according to one embodiment. In one embodiment, all-flash storage array 702 includes an active controller 1120, a standby controller 1124, and one or more SSDs 712. In one embodiment, the controller 1120 includes non-volatile RAM (NVRAM) 1118, which is for storing the incoming data as the data arrives to the storage array. After the data is processed (e.g., compressed and organized in segments (e.g., coalesced)), the data is transferred from the NVRAM 1118 to SSD 712.

In addition, the active controller 1120 further includes CPU 1108, general-purpose RAM 1112 (e.g., used by the programs executing in CPU 1108), input/output module 1110 for communicating with external devices (e.g., USB port, terminal port, connectors, plugs, links, etc.), one or more network interface cards (NICs) 1114 for exchanging data packages through network 1156, one or more power supplies 1116, a temperature sensor (not shown), and a storage connect module 1122 for sending and receiving data to and from SSD 712. In one embodiment, standby controller 1124 includes the same components as active controller 1120.

Active controller 1120 is configured to execute one or more computer programs stored in RAM 1112. One of the computer programs is the storage operating system (OS) used to perform operating system functions for the active controller device. In some implementations, one or more expansion shelves 1130 may be coupled to storage array 1102 to increase storage capacity.

Active controller 1120 and standby controller 1124 have their own NVRAMs, but they share SSDs 712. The standby controller 1124 receives copies of what gets stored in the NVRAM 1118 of the active controller 1120 and stores the copies in its own NVRAM. If the active controller 1120 fails, standby controller 1124 takes over the management of the storage array 1102. When servers, also referred to herein as hosts, connect to the storage array 702, read/write requests (e.g., IO requests) are sent over network 1156, and the storage array 702 stores the sent data or sends back the requested data to host 704.

Host 704 is a computing device including a CPU 1150, memory (RAM) 1146, permanent storage (HDD) 1142, a NIC card 1152, and an IO module 1154. The host 704 includes one or more applications 1136 executing on CPU 1150, a host operating system 1138, and a computer program storage array manager 1140 that provides an interface for accessing storage array 702 to applications 1136. Storage array manager 1140 includes an initiator 1144 and a storage OS interface program 1148. When an IO operation is requested by one of the applications 1136, the initiator 1144 establishes a connection with storage array 702 in one of the supported formats (e.g., iSCSI, Fibre Channel, or any other protocol). The storage OS interface 1148 provides console capabilities for managing the storage array 702 by communicating with the active controller 720 and the storage OS 1106 executing therein.

To process the IO requests, resources from the storage array 702 are required. Some of these resources may be a bottleneck in the processing of storage requests because the resources are over utilized, or are slow, or for any other reason. In general, the CPU and the hard drives of the storage array 702 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 712 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

Figure 9:
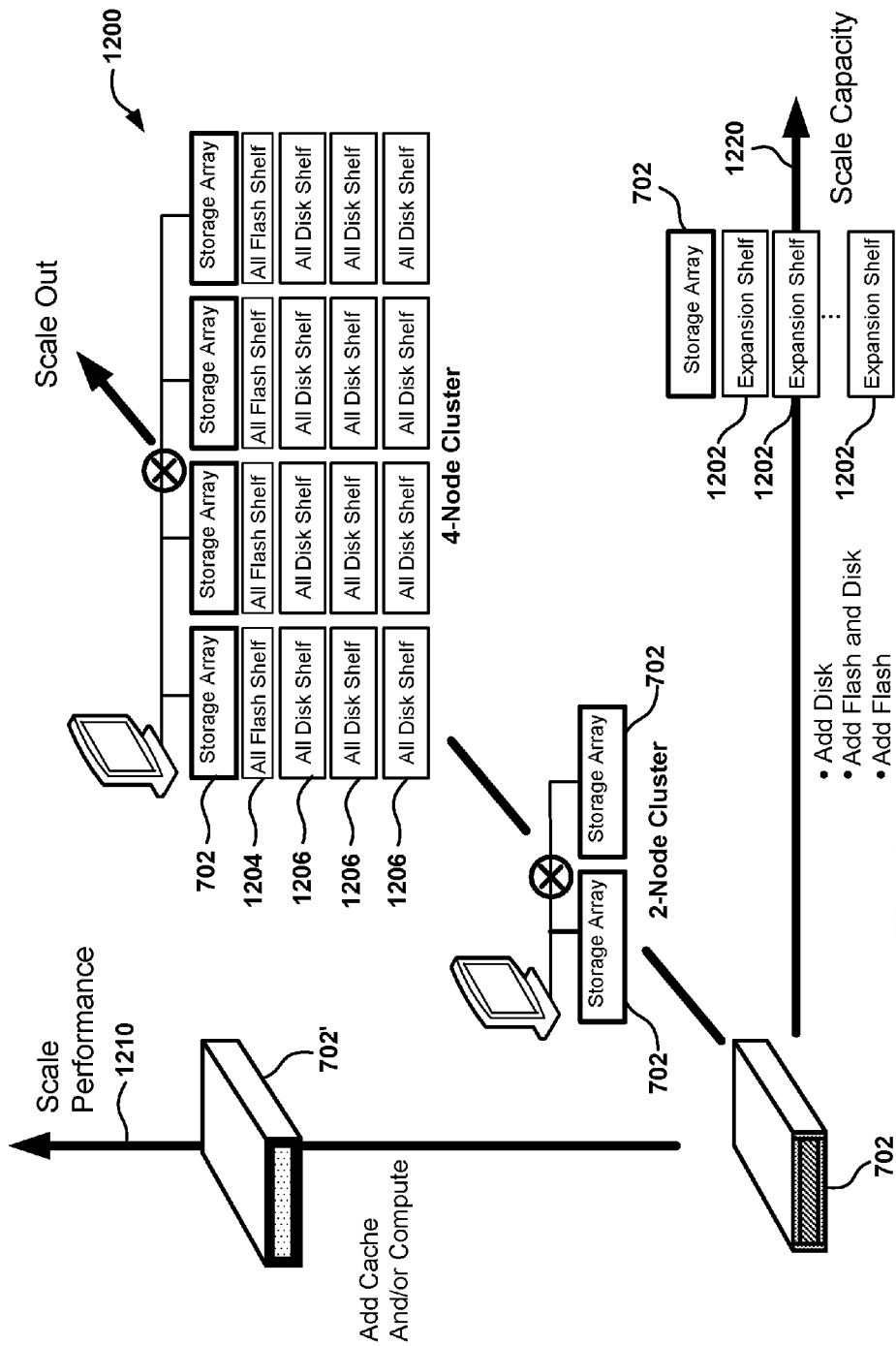
FIG. 9 is an example of the flexibility of the storage array, which can be expanded for scaling performance and for scaling capacity.

FIG. 9 is an example of the flexibility of the storage array, which can be expanded for scaling performance and for scaling capacity. In this illustration, the storage array can be adjusted to add cache and/or compute resources to define a more powerful storage array 702'. In one example, instead of upgrading the storage array 702, an upgraded storage array 702 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out by adding expansion shelves 1202 to the storage array 702. As discussed above, the expansion shelves 1202 may be defined by all-disk shelves (ADS) or all-flash shelves (AFS), or combinations of ADS and AFS shelves In a further example, the flexibility of the storage array 702 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 702, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A storage device comprising:
a processor;
memory coupled to the processor;
a solid state drive (SSD) having a performance value for completing write requests and read requests; and
a scheduler module stored in the memory and having program instructions for execution by the processor, wherein a chunklet size is predetermined based on the performance value, wherein the scheduler module is operable to schedule write requests and read requests received by the storage device for processing by the SSD;
wherein the scheduler module further includes a chunklet processor module stored in the memory and having program instructions for execution by the processor;
wherein the chunklet processor module is further operable to break a write request into a plurality of write segments each having a corresponding segment size less than or equal to the chunklet size when a size of the write request is greater than the chunklet size;
wherein the chunklet processor module is further operable to send to the SSD the plurality of write segments interleaved with a read request;
wherein the performance value is defined as a number of channels of the SSD times a page size of the SSD.

2. The storage device of claim 1, wherein a size of the read request is less than or equal to the chunklet size.

3. The storage device of claim 1, wherein the chunklet processor module is further operable to break the read request into a plurality of read segments each having a corresponding segment size less than or equal to the chunklet size when the size of the read request is greater than the chunklet size; and
wherein the chunklet processor module is further operable to send to the SSD the plurality of write segments interleaved with at least one of the plurality of read segments.

4. The storage device of claim 3, wherein each of the plurality of write segments has a corresponding segment size less than the chunklet size; and
wherein each of the plurality of read segments has a corresponding segment size less than the chunklet size.

5. The storage device of claim 1, wherein each of the plurality of write segments has a corresponding segment size less than the chunklet size.

6. A method comprising:
identifying a performance value for completing write requests and read requests by a solid state drive (SSD), the SSD being part of a storage device including a scheduler module, the scheduler module being operable to schedule write requests and read requests received by the storage device for processing by the SSD, the scheduler module including a chunklet processor module, wherein a chunklet size is predetermined based on the performance value;
breaking a write request into a plurality of write segments each having a corresponding segment size less than or equal to the chunklet size when a size of the write request of the write request is greater than the chunklet size;
sending to the SSD the plurality of write segments interleaved with a read request; and
defining the performance value as a number of channels of the SSD times a page size of the SSD.

7. The method of claim 6, wherein a size of the read request is less than or equal to the chunklet size.

8. The method of claim 6, further comprising:
breaking the read request into a plurality of read segments each having a corresponding segment size less than or equal to the chunklet size when the size of the read request is greater than the chunklet size; and
wherein the sending to the SSD the plurality of write segments further comprises sending the plurality of write segments interleaved with at least one of the plurality of read segments.

9. The method of claim 8, wherein each of the plurality of write segments has a corresponding segment size less than the chunklet size, and wherein each of the plurality of read segments has a corresponding segment size less than the chunklet size.

10. The method of claim 6, wherein each of the plurality of write segments has a corresponding segment size less than the chunklet size.

11. A storage device comprising:
a processor;
a solid state drive (SSD) having a performance value for completing write requests and read requests; and
a scheduler module having program instructions for execution by the processor, wherein a chunklet size is predetermined based on the performance value, wherein the scheduler module is operable to schedule write requests and read requests received by the storage device for processing by the SSD;
wherein the scheduler module further includes a chunklet processor module;
wherein the chunklet processor module is operable to determine if a size of a write request is greater than the chunklet size;
wherein the chunklet processor module is further operable to send to the SSD a segment from the write request when the size of the write request is greater than the chunklet size, the segment having a segment size equal to or less than the chunklet size;
wherein the performance value is defined as a number of channels of the SSD times a page size of the SSD.

12. The storage device of claim 11, wherein the chunklet processor module is further operable to send to the SSD the write request when the size of the write request is not greater than the chunklet size.

13. The storage device of claim 11, wherein the chunklet processor module is further operable to send to the SSD the plurality of write segments interleaved with a read request.

14. The storage device of claim 13, wherein a size of the read request is less than or equal to the chunklet size.

15. The storage device of claim 14, wherein the chunklet processor module is further operable to break the read request into a plurality of read segments each having a corresponding segment size less than or equal to the chunklet size when the size of the read request is greater than the chunklet size; and wherein the chunklet processor module is further operable to send to the SSD the plurality of write segments interleaved with at least one of the plurality of read segments.

* * * * *